United States Patent
Gagne et al.

(10) Patent No.: US 6,974,196 B2
(45) Date of Patent: Dec. 13, 2005

(54) ENDLESS TRACK FOR INDUSTRIAL OR AGRICULTURAL VEHICLES

(75) Inventors: Lucie Gagne, Sherbrooke (CA); Alain Lussier, St-François-Xavier-de-Brompton (CA)

(73) Assignee: Camoplast Inc., Sherbrooke (CA)

( * ) Notice: Subject to any disclaimer, the term of this patent is extended or adjusted under 35 U.S.C. 154(b) by 47 days.

(21) Appl. No.: 10/716,954

(22) Filed: Nov. 19, 2003

(65) Prior Publication Data

US 2005/0104450 A1    May 19, 2005

(30) Foreign Application Priority Data

Nov. 20, 2002    (CA) .................................. 2412182

(51) Int. Cl.[7] ............................................. B62D 55/24
(52) U.S. Cl. ..................................... 305/166; 305/179
(58) Field of Search .............................. 305/160, 165, 305/166, 170, 178, 179

(56) References Cited

U.S. PATENT DOCUMENTS

| | | | | |
|---|---|---|---|---|
| 2,476,460 A | * | 7/1949 | Smith ........................ 305/112 |
| 2,494,065 A | * | 1/1950 | Slemmons ................... 305/179 |
| 3,118,709 A | * | 1/1964 | Case .......................... 305/170 |
| 3,477,767 A | * | 11/1969 | McNeil ...................... 305/167 |
| 3,480,339 A | * | 11/1969 | Kell ........................... 305/166 |
| 5,005,922 A | | 4/1991 | Edwards et al. .............. 305/35 |
| 5,279,378 A | | 1/1994 | Grawey et al. ............ 180/9.21 |
| 5,352,029 A | * | 10/1994 | Nagorcka ................... 305/199 |
| 5,984,438 A | | 11/1999 | Tsunoda et al. ............ 305/169 |
| 6,068,354 A | * | 5/2000 | Akiyama et al. ........... 305/160 |
| 6,536,852 B2 | * | 3/2003 | Katayama et al. .......... 305/170 |

\* cited by examiner

Primary Examiner—Russell D. Stormer
(74) Attorney, Agent, or Firm—Fulbright & Jaworski LLP

(57) ABSTRACT

Described is an endless track for an industrial or agricultural vehicle consisting of a body formed of a rubber material having an outer surface displaying a series of ground engaging profiles longitudinally spaced along the surface and an inner surface displaying a series of longitudinally spaced drive lugs adapted to be engaged by drive sprockets on the vehicle driving assembly. The body of the endless track is fabric reinforced. One layer of fabric longitudinally extends at a distance from the inner surface of the track and has a width slightly less than the width of the drive lugs so that the fabric may extend inside the drive lugs to increase their rigidity.

2 Claims, 3 Drawing Sheets

ENDLESS TRACK FOR INDUSTRIAL OR AGRICULTURAL VEHICLES

FIELD OF THE INVENTION

The present invention relates to the field of endless tracks for track laying vehicles and, in particular, to the field of flexible tracks for use on industrial or agricultural vehicles.

BACKGROUND OF THE INVENTION

The propulsion system found on industrial and agricultural vehicles consists of a pair of longitudinally spaced apart wheel structures which are arranged on opposite sides of the vehicle's chassis, the latter being driven by a pair of endless, substantially inextensible tracks, each having an inner surface and an outer surface. These endless tracks consist of a flexible body formed of rubber material and are usually reinforced with one or more layers of fabric or steel material. The body includes series of longitudinally spaced profiles upon the outer surface thereof to provide traction to the vehicle and a series of longitudinally spaced drive lugs integrally moulded to the inner surface of the track to guide the track relative to driving and tracking wheels on the vehicle. The driving sprocket have drive teeth or bars positioned around the outer periphery thereof and positioned to engage the drive lugs on the inner surface of the track.

One such track structure is illustrated and described in U.S. Pat. No. 5,279,378 issued Jan. 18, 1994 to Caterpillar Inc. Similar tracks are also illustrated and described in U.S. Pat. No. 5,005,922 issued Apr. 9, 1991 to Edwards & Co. and U.S. Pat. No. 5,984,438 issued Nov. 16, 1999 to Tsunoda et al.

Drive lug deterioration due to the excessive torque transmitted to the drive lug and fatigue have been observed on many tracks resulting in drive lug delamination, chunking or even broken lugs.

OBJECTS AND STATEMENT OF THE INVENTION

The object of the present invention is to overcome the above-described problem with drive lug deterioration.

This is achieved by adding a fabric layer in the rubber track, which layer extends inside the drive lugs thereby reinforcing the structure and resulting in less deformation of the drive lug; this is due to the transfer of the exerted loads to the carcass by the fabric.

The present invention therefore relates to an endless track for industrial or agricultural vehicle which comprises a body formed of rubber material having an outer surface displaying a series of ground engaging profiles longitudinally spaced along the surface and an inner surface displaying a series of longitudinally spaced drive lugs adapted to be engaged by drive sprockets on the vehicle for retaining the track on the vehicle and for driving the vehicle; the drive lugs having a given width and height; the body includes, embedded therein, a layer of fabric longitudinally extending in the body at a distance inwardly from the inner surface; the fabric has a width substantially less than the given width of the drive lugs; the fabric extends in the drive lugs at a location corresponding substantially to the distance to thereby increase lug rigidity.

In one preferred form of the invention, the fabric is made of a material taken from the group including cotton, polyester, nylon, kevlar, glass fibers, steel etc.

Other objects, advantages and features of the present invention will become more apparent upon reading of the following non restrictive description of preferred embodiments thereof, given by way of example only with reference to the accompanying drawings.

DESCRIPTION OF THE PREFERRED EMBODIMENT

Figure 1:
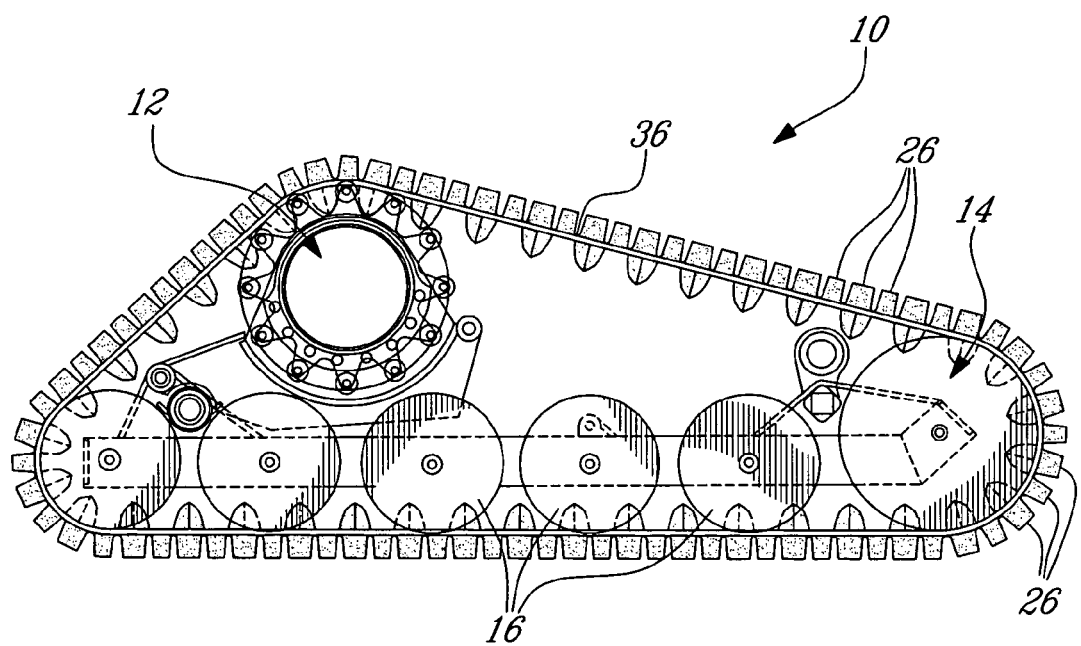
FIG. 1 is an elevational view showing a track assembly including a track made in accordance with the present invention, mounted about idler and drive wheels.

Referring to FIG. 1, there is shown a track assembly, generally denoted 10, which may be found on each opposite side of the chassis of a track propelled industrial or agricultural vehicle (not shown). The structure usually includes a drive wheel 12, a front idler wheel 14 and a series of track contacting rollers 16, the wheels and rollers being included within the loop defined by an endless track or belt 18. Traction to the track is achieved by its high frictional engagement with the wheels 12 and 14. The endless track made in accordance with the present invention comprises an endless elongated body made of rubber material having an outer surface 20 and an inner surface 22.

Figure 2:
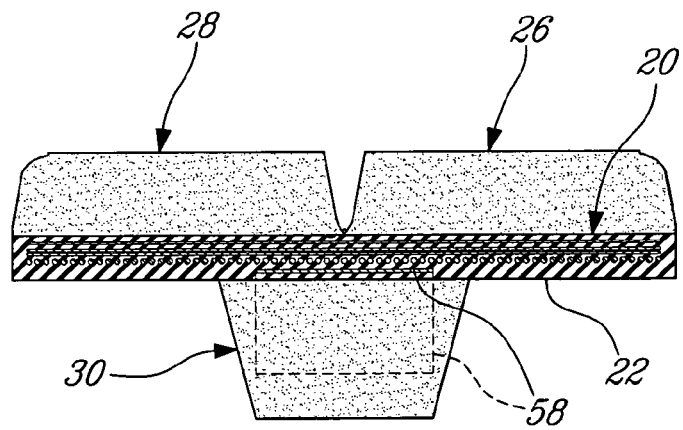
FIG. 2 is a cross-sectional view of the track.
Figure 3:
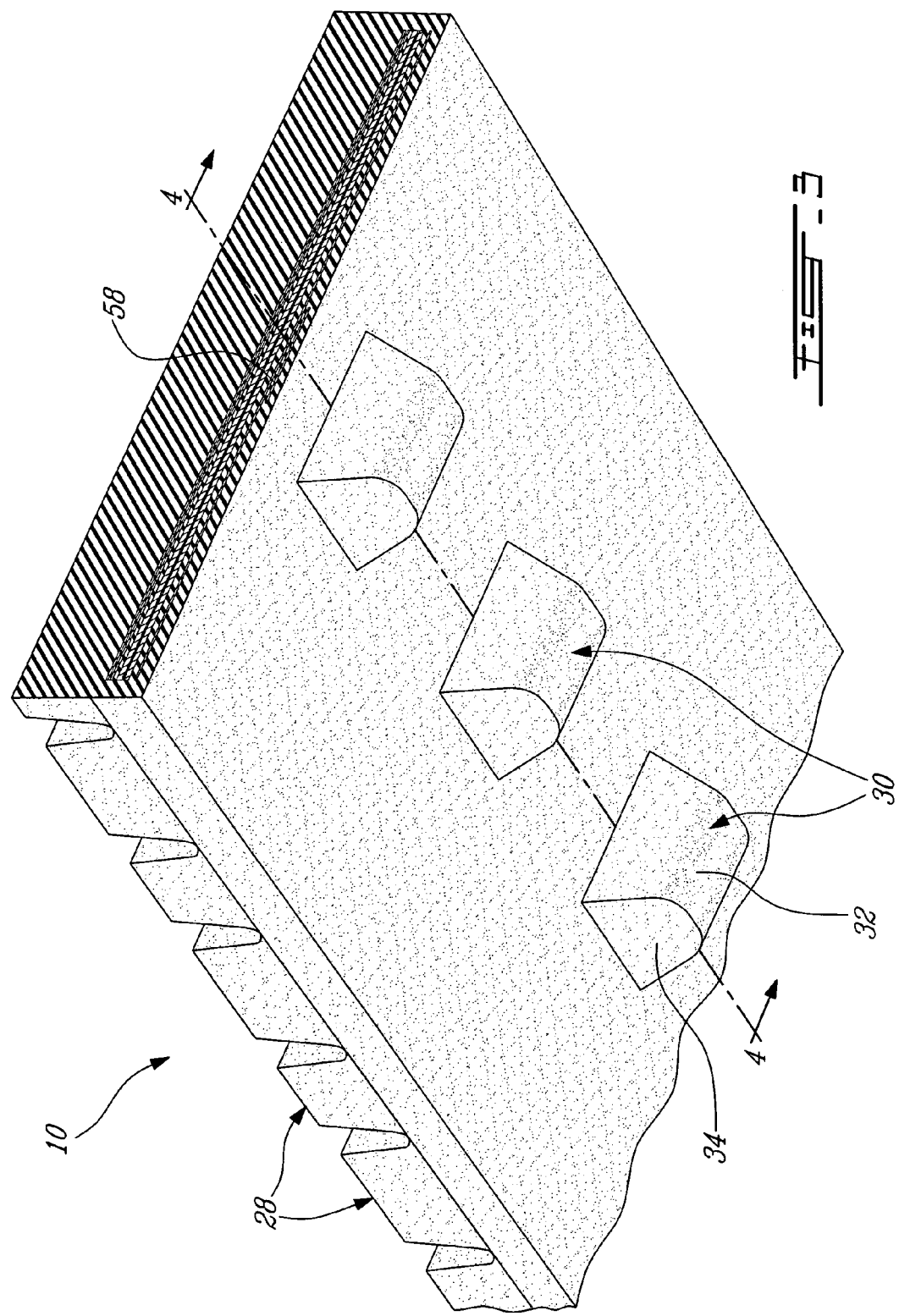
FIG. 3 is a perspective view of a section of the endless track made in accordance with the present invention.

With reference to FIGS. 2 and 3, the outer surface 20 comprises two rows of longitudinally spaced tread members 26 and 28 that provide traction to the vehicle while the inner face comprises a series of longitudinally spaced drive lugs 30 which are adapted to provide guiding of the track relative to the wheels of the drive structure as well as driving the track.

These drive lugs may have various shapes, such as the rounded surface 32 with opposite inclined side faces 34 illustrated in FIG. 3 or the trapezoidal shaped lugs illustrated in U.S. Pat. No. 6,300,396 issued Oct. 9, 2001 to Tsunoda et al.

Figure 4:
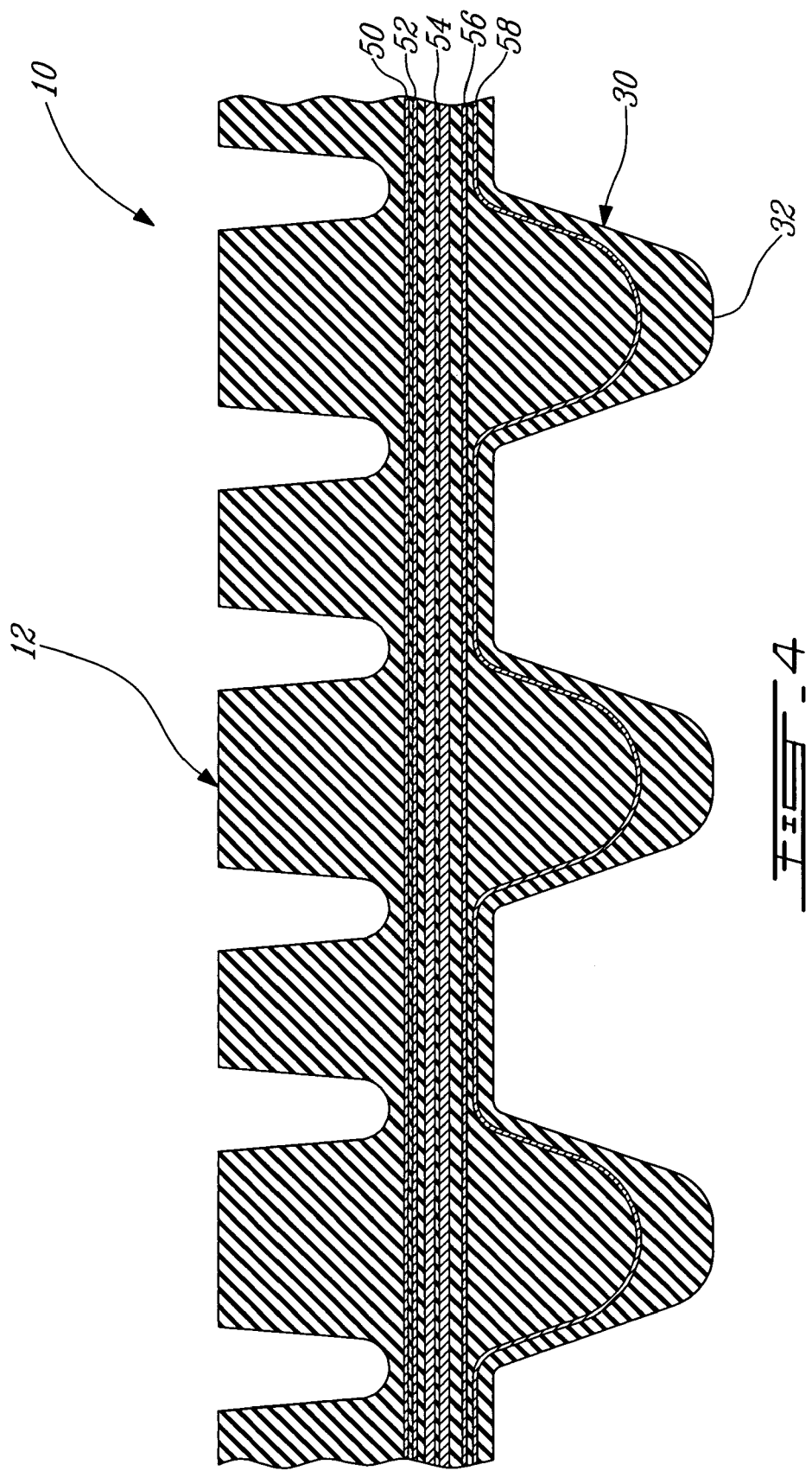
FIG. 4 is a cross-sectional view taken on lines 4—4 of FIG. 3.

Referring to FIG. 4, it can be seen that the track 10 includes a series of embedded layers of fabrics 50, 52, 54 and 56, which extend transversely for a major portion of the track width.

The present invention is concerned with providing an additional layer of fabric 58 throughout the longitudinal direction of the track; however, its width is slightly less than the width of the drive lugs 30 so as to be completely embedded in each drive lug of the track. This layer of fabric 58 is located at a given distance from the inner surface of the track and at a given distance from the rounded surface 32 of the lug so as to ensure its retention inside the track when the track is in use.

Although the invention has been described above with respect to one specific form, it will be evident to the person skilled in the art that it may be refined and varied in any ways. It is therefore wished to have it understood that the present invention should not be limited in interpretation except by the terms of the following claims.

What is claimed is:

1. An endless track for an industrial or agricultural vehicle comprising a body formed of rubber material having an outer surface displaying a series of ground engaging profiles longitudinally spaced along said surface and an inner surface displaying a series of longitudinally spaced drive lugs adapted to be engaged by drive sprockets on said vehicle for retaining said track on said vehicle and for driving said vehicle; said drive lugs having a given width and height; said body including, embedded therein, a layer of fabric longitudinally extending in said body at a distance inwardly from said inner surface; said fabric having a width slightly less than said given width of said drive lugs; said fabric extending into said drive lugs at a location corresponding substantially to said distance to thereby increase lug rigidity.

2. An endless track as defined in claim 1, wherein said fabric is made of a material taken from the group including cotton, polyester, nylon, kevlar, glass fibers and steel.

* * * * *